T. W. ANTIS.
BELT SHIFTING MECHANISM.
APPLICATION FILED MAY 5, 1919.
1,313,155.
Patented Aug. 12, 1919.
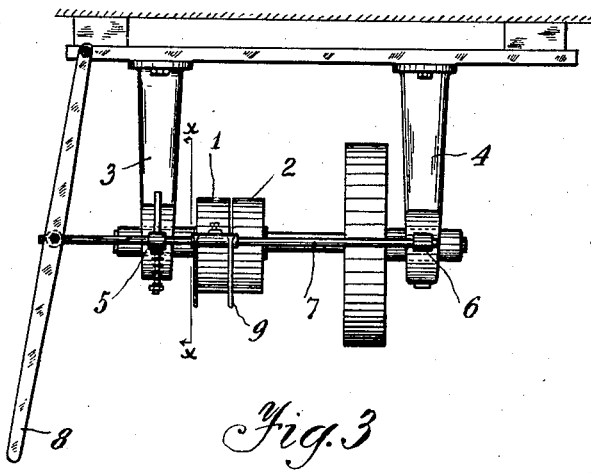
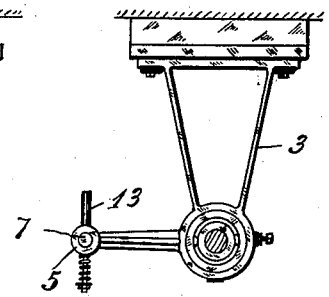
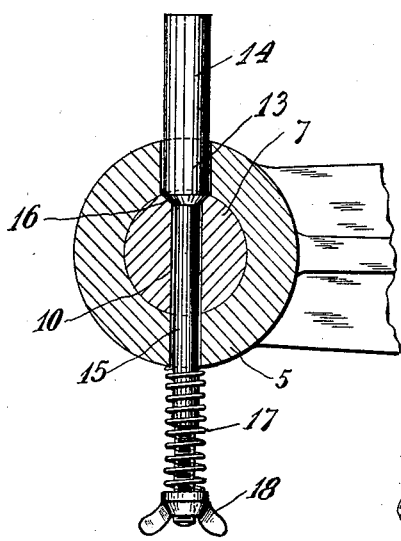
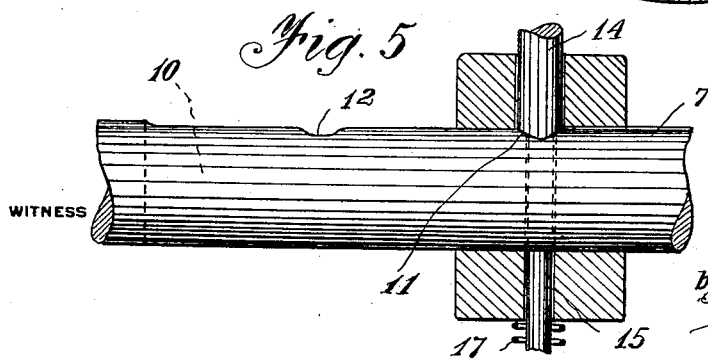
INVENTOR.
Thomas W. Antis
by Ralph Donath
Attorney

UNITED STATES PATENT OFFICE.

THOMAS W. ANTIS, OF EAST PITTSBURGH, PENNSYLVANIA.

BELT-SHIFTING MECHANISM.

1,313,155.  Specification of Letters Patent.  Patented Aug. 12, 1919.

Application filed May 5, 1919. Serial No. 294,631.

*To all whom it may concern:*

Be it known that I, THOMAS W. ANTIS, a citizen of the United States, residing at East Pittsburgh, in the county of Allegheny and State of Pennsylvania, have invented certain new and useful Improvements in Belt-Shifting Mechanism, of which the following is a specification.

This invention relates to a belt shifting mechanism and has for its primary object to provide mechanism for shifting a belt to either of its positions and effectively holding the same in said positions against accidental displacement.

An object of the invention is to provide simplified yieldable means capable of having its pressure regulated and also means for regulating the throw of the shifting rod.

Besides the above my invention is distinguished in the manner in which the pin is associated with the rod so that the longitudinal movement thereof is limited and besides the rod is prevented from turning in its bearings in case the rod is made of cylindrical material thereby insuring the proper registration of the recesses with the pin in a manner hereinafter described.

With these and other objects in view the invention will be better understood from the following detailed description taken in connection with the accompanying drawing wherein:

Figure 1 is a view of my invention in applied position.

Fig. 2 is a side elevation thereof on line x—x.

Fig. 3 is a sectional view.

Fig. 4 is a plan view of a portion of the rod.

Fig. 5 is a sectional view taken at right angle to Fig. 3.

Fig. 6 is a sectional view of a modified form of the invention.

Again referring to the drawing illustrating two of the many forms in which my invention may be constructed, the numeral 1 designates the usual tight pulley and the numeral 2 designates a loose pulley both mounted in the usual manner. Each of the hangers 3 and 4 are provided with projecting bearings 5 and 6 in which is slidably mounted a rod 7 actuated by a handle 8. The rod 7 has secured thereto the usual belt shifting fork 9.

In carrying out my invention, the rod 7, as clearly shown in Fig. 4, is provided with a slot 10 which in the preferred form of my invention, extends clear through the rod.

At spaced points in the length of the slot 10, I provide recesses 11 and 12 for a purpose now to be described.

Mounted within the slot 10 and slidably received by the bearing 5 is a pin 13 having an enlarged head portion 14 and a shank 15 of smaller diameter so as to form a shoulder 16 which is adapted to be seated in either of the recesses 11 and 12. For the purpose of resiliently holding the shoulder 16 in the recesses, I provide a coil spring 17, the tension of which is regulated by a thumb nut 18 threaded on the end of the shank 15.

From this arrangement it will be seen that the rod 7 may be readily slid to either of its two positions and held in either of these positions by the resilient engagement between the shoulder 16 and the recesses 11 and 12; and thus the rod 7 is held against accidental displacement. By having the pin constructed to coöperate with the rod as shown, the mechanism may be easily manipulated by the handle 8 and the pressure required accurately regulated by adjusting the tension of the spring 17 by the nut 18. The coöperation of the pin with the walls of the slot insures the proper registration of the shoulder 16 with the recesses.

In Fig. 6 I have shown the invention constructed in such a manner that it is not necessary to cut the slot 19 through the rod and this is accomplished by arranging the head portion 20 in the slot and arranging the spring 21 around the shank 22 of the pin in engagement with the head 20 and the end of an adjusting screw 23 which may be provided with a jam nut 24.

It is of course to be understood that the invention may be constructed in various other manners and the parts arranged in other relations and therefore I do not desire to be limited in any manner except as set forth in the claims hereunto appended.

Having described my invention, what I claim is:

1. A belt shifting mechanism comprising a belt engaging fork, means for shifting the fork including a rod having spaced recesses and a slot establishing communication between the recesses, and a spring pressed pin slidably mounted in the slot and adapted to engage either of said recesses.

2. A belt shifting mechanism comprising a belt engaging fork, means for shifting the fork including a rod having spaced recesses and a slot establishing communication between the recesses, a spring pressed pin slidably mounted in the slot and adapted to engage either of said recesses, and means for regulating the pressure of said pin in the recesses.

In testimony whereof I affix my signature in the presence of two witnesses.

THOMAS W. ANTIS.

Witnesses:
 PAUL PURCHARD,
 JNO. C. WILD.

Copies of this patent may be obtained for five cents each, by addressing the "Commissioner of Patents, Washington, D. C."